Sept. 3, 1963   J. E. RICHARDSON ETAL   3,102,954
PHOTOMULTIPLIER PULSE SHAPING CIRCUIT
Filed Dec. 8, 1959   2 Sheets-Sheet 1

INVENTORS:
J. E. RICHARDSON
W. R. ORR
BY: Theodore E. Bieber
THEIR ATTORNEY

Sept. 3, 1963         J. E. RICHARDSON ETAL         3,102,954
            PHOTOMULTIPLIER PULSE SHAPING CIRCUIT
Filed Dec. 8, 1959                              2 Sheets-Sheet 2

INVENTORS:
J. E. RICHARDSON
W. R. ORR
BY: *Theodore E. Bieber*
    THEIR ATTORNEY

United States Patent Office 3,102,954
Patented Sept. 3, 1963

3,102,954
PHOTOMULTIPLIER PULSE SHAPING CIRCUIT
Jasper E. Richardson, Houston, and William R. Orr, Bellaire, Tex., assignors to Shell Oil Company, a corporation of Delaware
Filed Dec. 8, 1959, Ser. No. 858,204
4 Claims. (Cl. 250—71.5)

This invention pertains to an output circuit for a photomultiplier tube when used in scintillation counters and more particularly to an output circuit which is capable of shaping and trimming the output pulses of a photomultiplier to provide pulses having desired wave forms.

When photomultiplier tubes are used in various types of spectrometers it is often necessary to shape and trim their output pulses in order to obtain pulses having a relatively narrow time width for operating coincidence circuits and the like while providing a pulse having a wide time width for analyzing to determine the various energy levels contained in the distribution of pulses. For example, in the pair spectrometer disclosed in a copending case of Orr, Richardson, and Baskir and entitled "Pair Spectrometer," Serial No. 858,205, filed December 8, 1959, there is disclosed a pair spectrometer utilizing two photomultiplier tubes, one of the tubes being provided with a composite phosphor consisting of a portion having a short decay time and a portion having a long decay time, while the second tube is provided with a single phosphor having a short decay time. Thus, it is necessary to separate the pulse of the first photomultiplier tube into that portion due to the fast decaying phosphor and that portion due to the slow decaying phosphor. This permits one to use the pulses from the fast decaying phosphor to operate a coincidence circuit while the pulse from the slow decaying phosphor may be analyzed to determine the energy level of the original radiation striking the phosphor. It is, of course, well known that results can be obtained more conveniently if one analyzes a slow decaying pulse than if one analyzes a fast decaying pulse. While slow decaying pulses are preferred for analyzing their broad time widths make them unsuitable for operating coincidence circuits since they greatly increase the possibility of chance coincidences triggering the coincidence circuit.

In other types of radiation instruments it is often times desirable to shorten a pulse width in order to provide a relatively narrow pulse for operating other equipment while preserving a broad pulse for analyzing and other operations.

Accordingly, it is the principal object of this invention to provide a novel circuit which is capable of shaping the pulse from a photomultiplier tube.

It is a further object of this invention to provide a novel circuit which is capable of modifying a signal from a photomultiplier tube to increase the time resolution of coincidence measurements.

It is still a further object of this invention to provide a novel circuit which is capable of narrowing the time width of the pulse from a photomultiplier tube to increase the resolution of coincidence measurements while preserving the original pulse for other purposes.

The above objects and advantages of this invention are achieved by providing a circuit in which separate signals are removed from a dynode of a photomultiplier tube and from the anode of a photomultiplier tube. By passing the two signals through separate circuits and then algebraically combining them it is possible to remove unwanted portions of the signal. More particularly, where the photomultiplier tube views a composite phosphor the signal may be separated into its individual components or, where the photomultiplier tube views a single slow decaying phosphor, the signal may be shaped as required by other operations.

The above objects and advantages of this invention will be more easily understood from the following detailed description of a preferred embodiment when taken in conjunction with the attached drawing in which.

Figure 1:
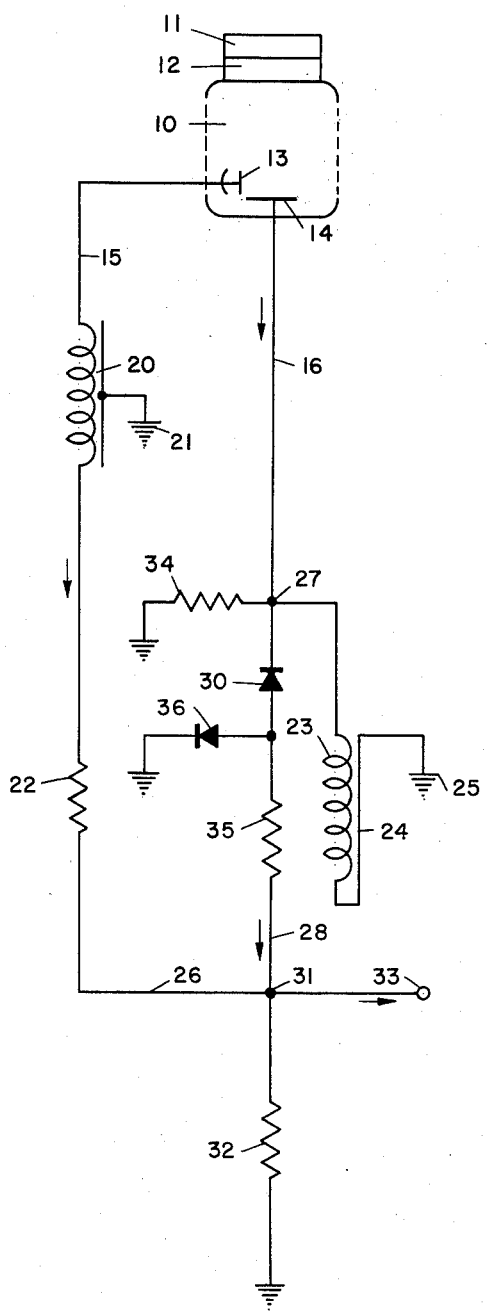
FIGURE 1 is a schematic drawing showing a circuit capable of separating a signal from a photomultiplier tube viewing a composite phosphor into its various components.

Referring now to FIGURE 1, there is shown a photomultiplier tube 10 which views two phosphors 11 and 12. The phosphor 11 is preferably a scintillation phosphor having a relatively slow decay time such as activated sodium iodide or cesium iodide. The phosphor 12 in turn is preferably a scintillation phosphor having a relatively fast decay time such as a synthetic plastic phosphor or a crystal phosphor such as stilbene. This arrangement of a composite phosphor viewed by a single photomultiplier tube is more fully described and claimed in the above-referenced copending application. The signal appearing on a dynode near the end of the photomultiplier tube 10, such as the last dynode 13, is removed and passed through one circuit while the signal appearing on the anode 14 of the tube is removed and passed to a second circuit.

The signal from the dynode 13 is connected by means of a lead 15 to a delay line 20 such as a coaxial cable with its shield grounded at 21. The signal from the delay line 20 is passed through a resistance 22 and coupled to a junction point 31 by means of a lead 26. The delay time of the delay line 20 should be chosen so that the signal from the dynode 13 arrives at the junction point 31 at the same time that the signal from the anode 14 arrives at the junction point. This delay is substantially equal to the travel time of the pulse from the dynode 13 to the anode 14. The signal transmitted from the dynode 13 through the delay line 20 to the junction point 31 will have substantially the wave form shown in FIGURE 2c. In this figure the portion of the signal marked A is largely due to the slow decaying phosphor 11 while the portion marked B is largely the result of the fast decaying phosphor 12.

The signal from the anode 14 is coupled by means of a lead 16 to a delay line 23 to form a clipping circuit well known by those skilled in the art, with a delay time essentially equaling the duration of the fast component. The delay line 23 is formed from a coaxial type cable having its outer sheath shorted to the conductor at one end and its opposite end grounded at 25. Thus, the delay line 23 will both delay and invert the signal appearing on the anode 14. The signal from the anode 14 is also coupled by the lead 16 to a grounded resistance 34 in order to properly terminate the delay line 23 and prevent reflections. The inverted signal is algebraically combined with the signal from the anode 14 at a junction point 27. The signal from the junction point 27 is coupled to the junction point 31 by means of a lead 28 having a rectifying element 30 and a resistance 35 disposed therein. The rectifying element 30 should be disposed so that it will pass only the negative portion of the combined signal. The negative portion of the combined signal is supplied by the lead 28 to the junction point 31 where it is algebraically combined with the signal from the dynode 13 supplied by the lead 26 with the combined signal being supplied as an output signal at terminal 33. The junction point 31 is coupled to ground through a load resistance 32 in order that the output signal may appear between the terminal 33 and ground. The resistance 22 is chosen of such value that the fast decay signal from dynode 13 appears at junction point 31 with substantially the same amplitude as the signal from anode 14. A resistance 35 and rectifying element 36 form a decoupling network to prevent positive signal from passing from junction point 31 to anode 14 while allowing negative signals to pass from anode 14 to junction point 31.

Referring now to the curves shown in FIGURE 2, the curve 2a represents the signal appearing on the anode 14 of the photomultiplier tube 10. It will be noted that this curve has substantially the same wave form and a slightly larger amplitude than the signal which appears on the dynode 13 of the tube 10 but is of the opposite polarity. The curve 2b illustrates the wave form of the signal which is reflected by the shorted delay line 23 while the curve 2c represents the shape of the signal when curves 2a and 2b are algebraically combined at the junction point 27. It should be noted that by delaying and reversing the signal from the anode 14 the portion A of the signal shown in FIGURE 2a is cancelled, leaving only two relatively sharp signals, one negative and one positive. The negative components of these sharp signals are the portions B in FIGURES 2a and 2b while the positive components are the portions B with the contribution from the slow decaying phosphor removed. Thus the positive components originate in the fast decaying phosphor 12 alone. When the signal shown in FIGURE 2c is applied to the rectifying element 30 only the negative portion will pass through and the positive portion will be blocked, resulting in a signal shown in FIGURE 2d. The signal of FIGURE 2d will be supplied by the lead 28 to the junction point 31. The signal which appears on the dynode 13 will be delayed slightly by the delay line 20 and appear as shown in FIGURE 2e. This signal will also be supplied to the junction point 31 by the lead 26. When the signals shown in FIGURES 2d and 2e are algebraically combined at the junction point 31 the sharp negative signal of FIGURE 2d will cancel the sharp positive portion B of the signal shown in FIGURE 2e, leaving only the broad signal or pulse A shown in FIGURE 2f.

Figure 2A:
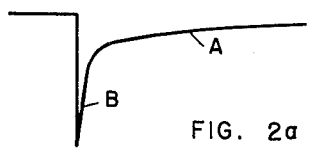
FIGURE 2 is a series of curves showing the shape of a pulse appearing at various points in the circuit of FIGURE 1.
Figure 2B:
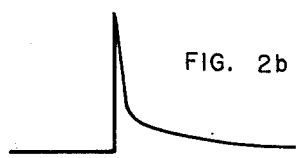
Figure 2C:
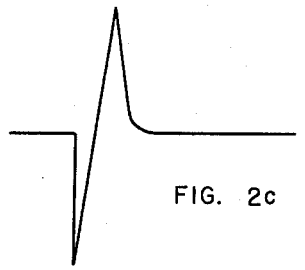
Figure 2D:
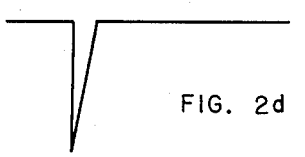
Figure 2E:
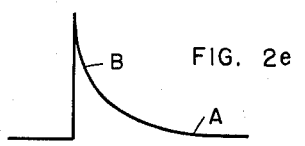
Figure 2F:

From the above description it can be appreciated that the circuit described can supply either the broad pulse resulting from the slow decaying phosphor 11 and illustrated in FIGURE 2f essentially free of that portion of the pulse due to the fast decay phosphor 12 as well as a pulse produced in a manner well known to those skilled in the art and illustrated by the positive portion in FIGURE 2c which is the result of the fast decay phosphor 12 and is essentially free of any portion of the signal due to the slow decaying phosphor 11. The broad pulse shown in FIGURE 2f appears at the output terminal 33 of the circuit. Thus, the circuit provides sharp pulses which are highly desirable for operating coincidence circuits and at the same time broad pulses from slow decaying phosphor which are highly desirable for analyzing radiation for various energy levels. The use of these pulses in the operation of coincidence circuits and for analyzation is more fully explained in the above-referenced copending application.

Figure 3:
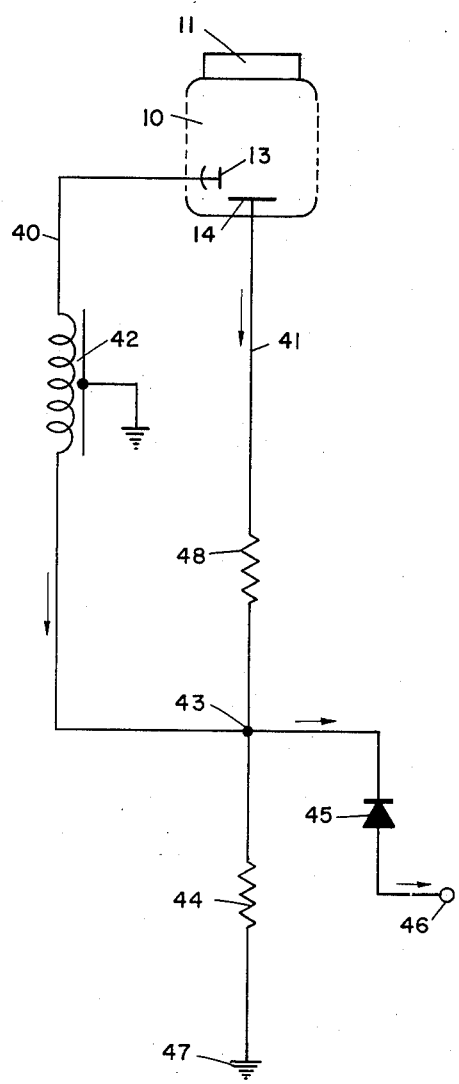
FIGURE 3 is a schematic drawing of a second embodiment of this invention which is capable of narrowing the width of a pulse from a photomultiplier tube viewing a single phosphor; and, FIGURE 4 is a series of curves showing the shape of the pulse in various points in the circuit in FIGURE 3.
Figure 4A:
Figure 4B:
Figure 4C:
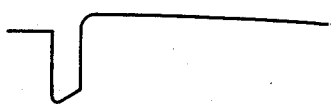
Figure 4D:

Referring now to FIGURES 3 and 4, there is shown a second embodiment of this invention which is useful for reducing the width of a broad pulse in order to supply a relatively narrow pulse suitable for operating a coincidence circuit. FIGURE 3, elements which are substantially the same as shown in FIGURE 1 have the same numerals. The photomultiplier tube 10 of FIGURE 3 views a single phosphor 11 which is a slow decaying phosphor such as cesium iodide or sodium iodide. The pulse from the dynode 13 of the tube 10 is coupled to a delay line 42 by means of a conductor 40 while the pulse appearing from the anode 14 is coupled to a voltage dividing network formed by resistances 44 and 48 by means of a conductor 41. The signal from the delay line 42 and the middle of the voltage dividing network are algebraically combined at a junction point 43. The combined signal at the junction point 43 is coupled to an output terminal 46 through a diode 45. The diode 45 is disposed so that it will pass only the negative portion of the pulse appearing at the junction point 43. When the above circuit is operated the pulse from the anode 14 will appear at the junction point 43 substantially undelayed and, by adjustment of one resistance 48, at an amplitude substantially equal to that of the pulse from the dynode 13, while the pulse from the dynode 13 will appear at the junction point 43 delayed by the delay time of the delay line 42. This delayed time should be chosen so that it exceeds the travel time of the pulse from the dynode 13 to the anode 14 by a time equal to the desired time width of the final pulse. Thus, the pulse supplied to the junction point 43 by conductor 41 will have a wave form similar to that shown in FIGURE 4a while the pulse shown in FIGURE 4b will represent the delayed pulse from the dynode 13. When these two pulses of FIGURES 4a and 4b are algebraically combined at the point 43 the resulting pulse will have a wave form similar to that shown in FIGURE 4c. It will be noted that this pulse has a relatively narrow width negative portion and a wide time width positive portion of relatively small amplitude. When this pulse passes through the diode 45 the positive portion will be removed leaving only the narrow width negative portion shown in FIGURE 4d.

From the above description it can be readily appreciated that a pulse having a relatively broad time width such as a pulse from a phosphor having slow decay time may be shortened to supply a relatively narrow pulse suitable for operating coincidence circuits and the like. With a decoupling circuit between resistance 48 and junction point 43, this narrow pulse may be obtained while still preserving the wide pulse for use in analyzing circuits and the like. Such a decoupling circuit is shown as resistance 35 and rectifying element 36 in FIGURE 1. It is, of course, to be understood that the amplitude and shape of the pulses shown in FIGURES 2 and 4 are for the purpose of illustrating the invention since the actual pulses will depend upon the particular phosphors actually used.

While but two embodiments of this invention have been described in detail, it should not be limited to the particular details described since it is susceptible to many modifications and changes within its broad scope and spirit.

We claim as our invention:

1. An output circuit for a photomultiplying tube of a scintillation type radiation detector having two phosphors with different decay times comprising: a first conductive path for the signal appearing on a dynode of the photomultiplier tube, said first conductive path including a delay circuit means for the dynode signal; a second conductive path for the signal appearing on the anode of the photomultiplier tube, said second path including a circuit having both a means for removing from said anode signal the portion of said signal resulting from the phosphor having the slowest decay time and a rectifying means for converting the remaining anode signal to a unidirectional signal of opposite polarity to the dynode signal; and circuit means algebraically combinging the signal from said first and second conductive paths.

2. An output circuit for a photomultiplier tube of a scintillation type radiation detector having two phosphors with different decay times comprising: a first conductive path for the signal appearing on a dynode of the photomultiplier tube when the phosphors are excited by radiation, said first path including a delay means for delaying the dynode signal for the time required for the signal to travel from said dynode to the anode of the photomultiplier tube; a second conductive path for the signal from the anode of the photomultiplier tube, said second conductive path including both a circuit means for reversing and delaying said anode signal and then algebraically combining the delayed and reversed signal with the original anode signal, a rectifying element disposed in said second conductive path to pass unidirectional signals having the opposite polarity of said dynode signal; circuit means for adjusting the amplitude of the signals from said first and second conductive paths; and a circuit means for algebraically combining the signals from the first and second conductive path.

3. An output circuit for the photomultiplier tube of a scintillation type of radiation detector comprising: a first conductive path for the signal appearing on a dynode of the photomultiplier tube when the phosphor of the detector is excited by radiation, said first path including a signal delay means; a second conductive path for the signal appearing on the anode of the photomultiplier tube; circuit means for algebraically combining the signals from said first and second conductive paths and a rectifying circuit for converting the combined signal to a unidirectional signal.

4. An output circuit for the photomultiplier tube of a scintillation type of radiation detector comprising: a first conductive path for the signal appearing on a dynode of the photomultiplier tube when the phosphor of the detector is excited by radiation, said first path including a signal delay means for delaying said dynode signal a greater time than the time required for a signal to pass from the dynode to the anode of the photomultiplier tube; a second conductive path for the signal appearing on the anode of the photomultiplier tube; circuit means for algebraically combining the signal from said first and second conductive paths and a rectifying circuit for converting the combined signal to a unidirectional signal.

References Cited in the file of this patent

UNITED STATES PATENTS

| | | |
|---|---|---|
| 2,517,404 | Morton | Aug. 1, 1950 |
| 2,910,592 | Armistead | Oct. 27, 1959 |
| 2,994,781 | Brooks | Aug. 1, 1961 |